(12) United States Patent
Lee et al.

(10) Patent No.: US 8,514,811 B2
(45) Date of Patent: Aug. 20, 2013

(54) METHOD AND APPARATUS OF PERFORMING HANDOVER IN WIRELESS COMMUNICATION SYSTEM

(75) Inventors: Sook Jin Lee, Daejeon (KR); Yong Seouk Choi, Daejeon (KR); Namsuk Lee, Daejeon (KR); Nak Woon Sung, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 329 days.

(21) Appl. No.: 12/862,165

(22) Filed: Aug. 24, 2010

(65) Prior Publication Data

US 2011/0051686 A1    Mar. 3, 2011

(30) Foreign Application Priority Data

Aug. 28, 2009 (KR) .................. 10-2009-0080435
Jun. 25, 2010 (KR) .................. 10-2010-0060750

(51) Int. Cl.
*H04W 36/12* (2009.01)

(52) U.S. Cl.
USPC ........................................ 370/331

(58) Field of Classification Search
USPC ........................................... 370/331
See application file for complete search history.

(56) References Cited

U.S. PATENT DOCUMENTS

| 5,896,373 A * | 4/1999 | Mitts et al. ............... 370/331 |
| 2002/0194571 A1* | 12/2002 | Parr et al. ............... 714/800 |
| 2006/0025138 A1* | 2/2006 | Kotzin ............... 455/445 |
| 2008/0064432 A1* | 3/2008 | Park et al. ............... 455/522 |
| 2009/0111525 A1 | 4/2009 | Hwang |
| 2011/0007712 A1* | 1/2011 | Lee ............... 370/332 |

FOREIGN PATENT DOCUMENTS

| KR | 10-2009-0044352 A | 5/2009 |
| KR | 10-2009-0091930 A | 8/2009 |

* cited by examiner

*Primary Examiner* — Sulaiman Nooristany
(74) *Attorney, Agent, or Firm* — Jefferson IP Law, LLP

(57) ABSTRACT

A method of performing a handover procedure of a handover performing apparatus in a wireless communication system in which a macro base station and a femto base station coexist is provided. The method of performing the handover procedure of the handover performing apparatus includes detecting an uplink signal transmitted from a terminal to the macro base station, sending a report message including information about the uplink signal to the macro base station, and performing the handover procedure with the terminal when the macro base station triggers handover based on the report message.

14 Claims, 6 Drawing Sheets

METHOD AND APPARATUS OF PERFORMING HANDOVER IN WIRELESS COMMUNICATION SYSTEM

PRIORITY

This application claims the benefit under 35 U.S.C. §119 (a) of a Korean patent application filed on Aug. 28, 2009 in the Korean Intellectual Property Office and assigned Ser. No. 10-2009-0080435 and a Korean patent application filed on Jun. 25, 2010 and assigned Ser. No. 10-2010-0060750, the entire disclosures of each of which are hereby incorporated by reference.

BACKGROUND OF THE INVENTION

1. Field of the Invention

The present invention relates to a handover method between a femto base station and a macro base station.

2. Description of the Related Art

Active research has recently been done on a base station that manages small cells within a macrocell coverage area. The small cell is referred to as a femtocell, and a base station managing the femtocell is referred to as a femto base station. For example, when a femto base station is installed indoors, a user of a mobile communication system can be provided with service through a macro base station outdoors and can be provided with service through the femto base station indoors.

The femto base station is constructed to have a small cell radius (e.g., about 30 m). Many femto base stations can be installed within a macrocell coverage area. The femto base station is unable to control power in detail like a macro base station, and is also unable to perform proper cell planning at a system level. Accordingly, when a terminal seeks to connect to a femto base station located close to a macro base station or a femto base station located in an area where a high intensity signal is received from a macro base station, a problem can occur during handover. Although the terminal enters a coverage area of the femto base station, if a difference between the intensity of a signal received from the macro base station and the intensity of a signal received from the femto base station is not greater than a certain range or more, the terminal remains connected to the macro base station.

Accordingly, when a macro base station and a femto base station coexist in the same environment, and a terminal seeks to connect to a femto base station located close to the macro base station or a femto base station located in an area where a high intensity signal is received from the macro base station, a method of performing handover between the terminal and the femto base station is desired.

SUMMARY OF THE INVENTION

An aspect of the present invention is to address at least the above-mentioned problems and/or disadvantages and to provide at least the advantages described below. Accordingly, an aspect of the present invention is to provide a handover method from a macro base station to a femto base station. Further, an aspect of the present invention is to provide a handover method when a femto base station is located close to a macro base station or is located in an area where a high intensity signal is received from a macro base station is excellent.

In accordance with an aspect of the present invention, a method of performing a handover procedure of a handover performing apparatus in a wireless communication system in which a macro base station and a femto base station coexist is provided. The method includes detecting an uplink signal transmitted from a terminal to the macro base station, sending a report message including information about the uplink signal to the macro base station and when the macro base station triggers handover based on the report message, performing the handover procedure with the terminal.

In accordance with another aspect of the present invention, a method of performing a handover procedure of a handover performing apparatus in a wireless communication system in which a macro base station and a femto base station coexist is provided. The method includes receiving a report message including information about an uplink signal recognized by the femto base station from the femto base station, identifying a terminal that has entered a coverage area of the femto base station based on the report message and requesting the identified terminal to hand over to the femto base station.

In accordance with yet another aspect of the present invention, a handover performing apparatus of a femto base station is provided. The apparatus includes a receiving unit for receiving an uplink signal from a terminal, an uplink information acquisition unit for acquiring information about the uplink signal, a transmission unit for sending the information about the uplink signal to a macro base station and a handover processing unit for performing a handover procedure triggered by the macro base station with the terminal based on the information about the uplink signal.

In accordance with still another aspect of the present invention, a handover performing apparatus of a macro base station is provided. The apparatus includes a receiving unit for receiving information about an uplink signal, recognized by a femto base station, from the femto base station, a terminal search unit for identifying a terminal that has entered the femto base station coverage area based on the information about the uplink signal and a handover processing unit for requesting the identified terminal to hand over to the femto base station.

In accordance with another aspect of the present invention, a femto base station is provided. The femto base station includes a communication unit for communicating with a macro base station and at least one terminal, a terminal detection unit for detecting an uplink message transmitted from the terminal to the macro base station within a coverage area of the femto base station and for transmitting information on the terminal to the macro base station, and a handover performing unit for performing a handover with the terminal based on a request received from the macro base station in response to the information transmitted by the terminal detection unit.

According to an aspect of the present invention a handover method is provided for a case where a terminal seeks to connect to a femto base station located close to a macro base station. Accordingly, a terminal user can employ advantageous functions of a femto base station, and there is an advantageous effect in terms of billing.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. In the entire specification, unless explicitly described to the contrary, the word "comprise" and variations such as "comprises" or "comprising" will be understood to imply the inclusion of stated elements but not the exclusion of any other elements.

In the specification, a Mobile Station (MS) may refer to a terminal, a Mobile Terminal (MT), a Subscriber Station (SS), a Portable Subscriber Station (PSS), User Equipment (UE), or an Access Terminal (AT), and some or all of the functions of the MS, the terminal, the MT, the SS, the PSS, the UE, or the AT may be included.

In the specification, a Base Station (BS) may refer to an Access Point (AP), a Radio Access Station (RAS), a node B (nodeB), an evolved NodeB (eNodeB), a Base Transceiver Station (BTS), or a Mobile Multihop Relay (MMR)-BS, and some or all of the functions of the BS, the AP, the RAS, the node B, the eNodeB, the BTS, or the MMR-BS may be included.

Figure 1:
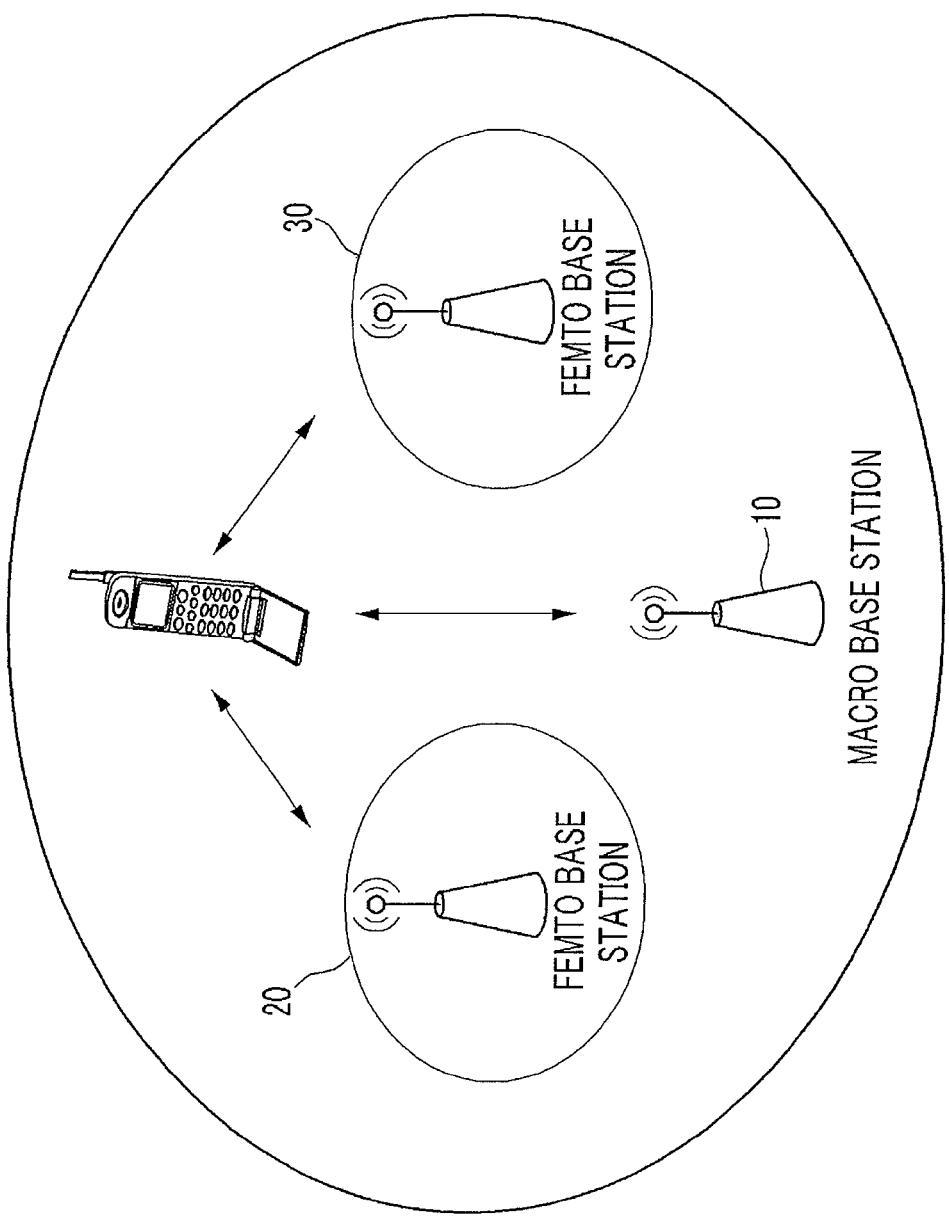
FIG. 1 is a diagram schematically showing a structure of a wireless communication system according to an exemplary embodiment of the present invention.

FIG. 1 is a diagram schematically showing a structure of a wireless communication system according to an exemplary embodiment of the present invention.

Referring to FIG. 1, a plurality of femto base stations 20 and 30 are present within a cell of one macro base station 10. The macro base station has a large cell radius. Each femto base station is connected to the macro base station through a backbone connection. The femto base station may perform communication using its own network capacity and typically has a small cell radius. Unlike the macro base station, the femto base station can be turned on or off and can operate in a sleep mode for power saving. A handover method in an environment in which a macro base station and a femto base station coexist is described below.

Figure 2:
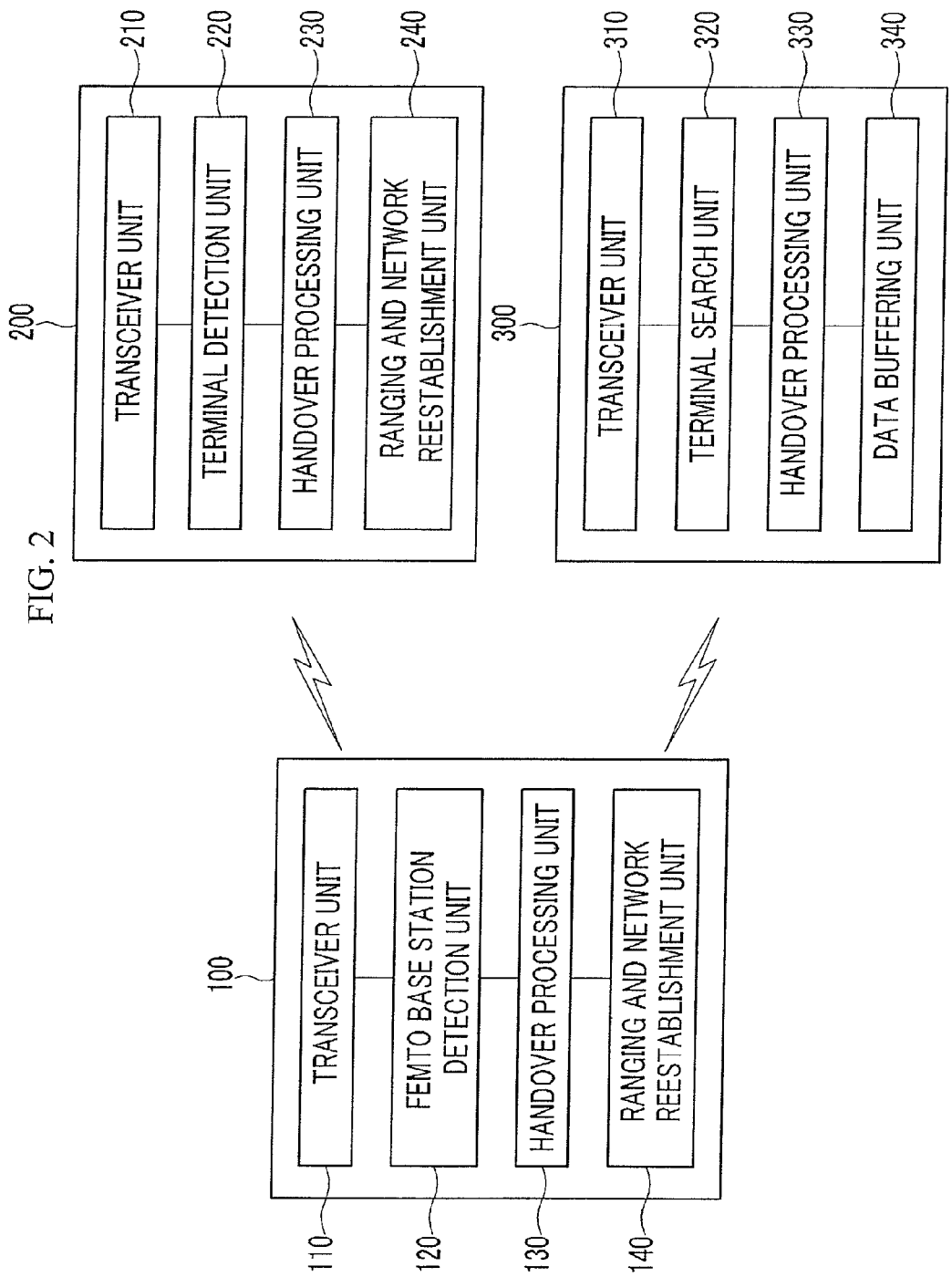
FIG. 2 is a schematic block diagram showing a terminal, a handover performing apparatus of a femto base station, and a handover performing apparatus of a macro base station according to an exemplary embodiment of the present invention.
Figure 3:
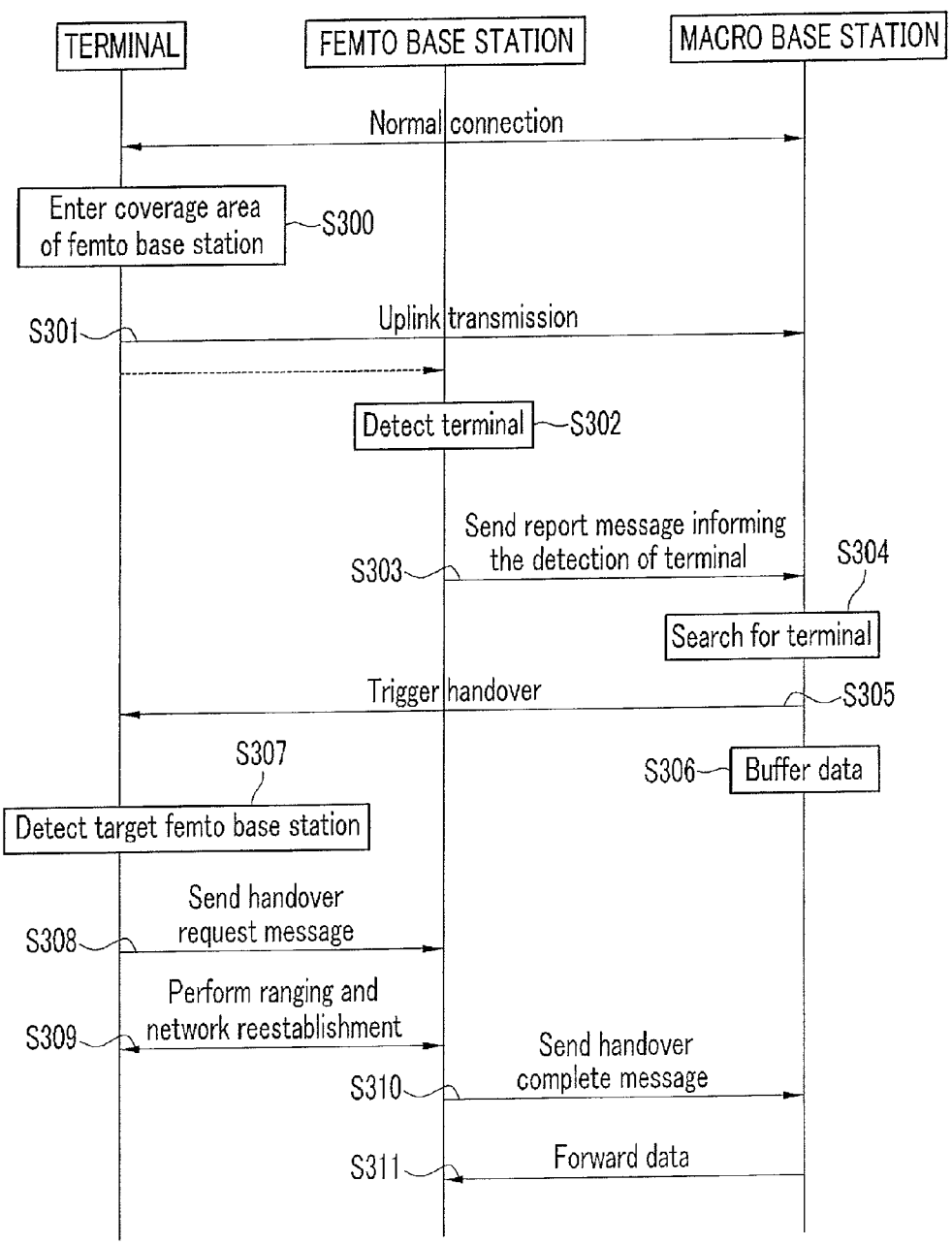
FIG. 3 is a flowchart illustrating a handover method according to an exemplary embodiment of the present invention.

FIG. 2 is a schematic block diagram showing a terminal, a handover performing apparatus of a femto base station, and a handover performing apparatus of a macro base station according to an exemplary embodiment of the present invention, and FIG. 3 is a flowchart illustrating a handover method according to an exemplary embodiment of the present invention.

Referring to FIG. 2, a terminal 100 includes a transceiver unit 110, a femto base station detection unit 120, a handover processing unit 130, and a ranging and network reestablishment unit 140. The terminal 100 may include additional units. Similarly, the functionality of two or more of the above units may be integrated into a single component.

A handover performing apparatus of a femto base station 200 includes a transceiver unit 210, a terminal detection unit 220, a handover processing unit 230, and a ranging and network reestablishment unit 240. A handover performing apparatus of a macro base station 300 includes a transceiver unit 310, a terminal search unit 320, a handover processing unit 330, and a data buffering unit 340.

Referring to FIGS. 2 and 3, when the terminal 100 is normally connected to the macro base station 300, the terminal 100 can enter a coverage area of the femto base station 200 at step S300. If the transceiver unit 110 of the terminal 100 sends an uplink signal to the macro base station 300 at step S301, the femto base station 200 can receive the uplink signal.

The terminal detection unit 220 of the femto base station 200 detects that the terminal 100 has entered the coverage area of the femto base station 200 at step S302. If the femto base station 200 has previously received information indicating that the terminal 100 approaches from the macro base station 300, the femto base station 200 can determine that the terminal 100 has entered the coverage area of the femto base station 200 using the uplink signal transmitted from the terminal 100 to the macro base station 300. If the femto base station 200 has not previously received information indicating that the terminal 100 approaches, the femto base station 200 does not determine channel information of the terminal 100 and thus recognizes the uplink signal of the terminal 100 as an interference signal. Accordingly, if an intensity of the interference signal exceeds a reference value for a certain period of time, the femto base station 200 can determine that the terminal 100 has entered the coverage area of the femto base station 200. The reference value can be previously configured by the femto base station 200 or the macro base station 300, or both.

At step S303, the transceiver unit 210 of the femto base station 200 sends a report message to the macro base station 300 indicating that the femto base station 200 has detected the terminal 100. If the femto base station handover performing apparatus 200 has recognized the uplink signal of the terminal 100 as an interference signal, the report message can include information about the interference signal. The information about the interference signal can include information about a point of time when the intensity of the interference signal is greater than a reference value and information about the length of a section in which the intensity of the interference signal is greater than a reference value.

At step S304, the terminal search unit 320 of the macro base station 300 identifies the terminal 100 that has entered the femto base station 200 coverage area based on the report message received at step S303. The handover processing unit 330 of the macro base station 300 triggers handover by sending a message requesting the identified terminal 100 to perform the handover to the femto base station 200 to the identified terminal 100 at step S305. After the handover is triggered, the macro base station 300 does not send downlink data to the corresponding terminal 100, but buffers the downlink data in the data buffering unit 340 at step S306.

The femto base station detection unit 120 of the terminal 100 detects a target femto base station through a scanning process at step S307. When the terminal 100 detects the target femto base station 200, the handover processing unit 130 of the terminal 100 sends a handover request message to the femto base station 200 at step S308, and performs the procedures for the handover.

The ranging and network reestablishment unit 140 of the terminal 100 performs a ranging and network reestablishment procedure with the femto base station 200 at step S309. When the ranging and network reestablishment procedure with the terminal 100 is completed, the handover processing unit 230 of the femto base station 200 sends a handover complete message to the macro base station 300 at step S310. The macro base station 300 that has received the handover complete message from the femto base station 200 forwards the downlink data buffered for the terminal 100 to the femto base station 200 at step S311.

As described above, when a terminal cannot trigger handover because a difference between intensity of a signal received from a serving macro base station and intensity of a signal received from a target femto base station is not sufficient, the serving macro base station can trigger the handover. Detailed operations of the femto base station, the macro base station, and the terminal in the case in which the terminal enters the femto base station coverage area are described below.

Figure 4:
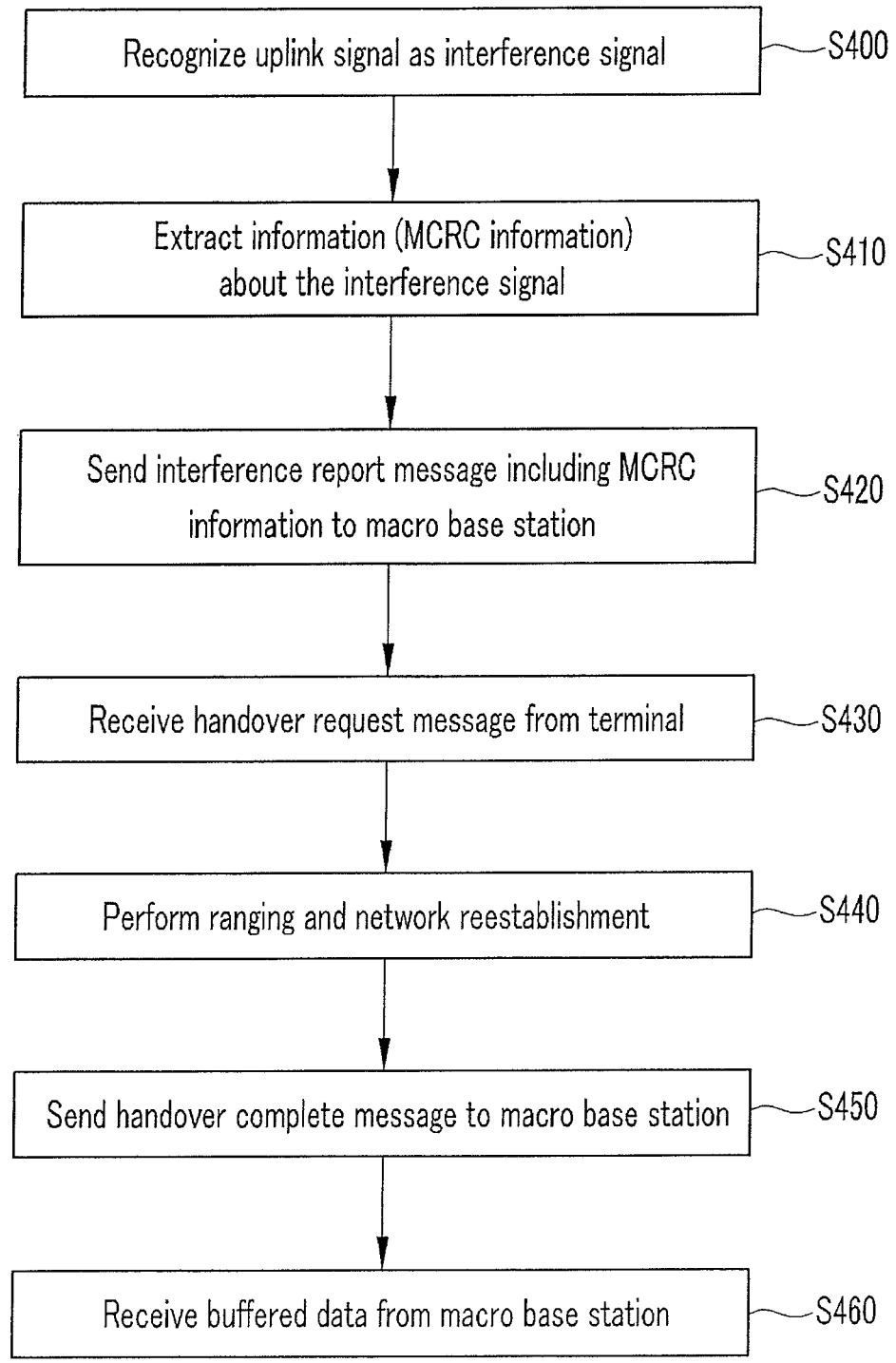
FIG. 4 is a flowchart illustrating an operation of a femto base station in a handover method according to an exemplary embodiment of the present invention.

FIG. 4 is a flowchart illustrating an operation of a femto base station in a handover method according to an exemplary embodiment of the present invention.

Referring to FIG. 4, the femto base station 200 recognizes an uplink signal received from the terminal 100 as an interference signal at step S400, and extracts information about the interference signal at step S410.

If the femto base station 200 already knows uplink (UL) resource allocation information (e.g., UL-MAP) of the macro base station 300, the femto base station 200 can determine a point of time when terminals to which uplink resources have been allocated by the macro base station perform uplink transmission. In this case, if an intensity of an interference signal is greater than a reference value when a specific terminal 100 performs uplink transmission, the femto base station 200 can determine that the corresponding terminal 100 has entered a coverage area of the femto base station 200. Information about the interference signal can include Masked Cyclic Redundancy Check (MCRC) information of the terminal 100 about a section in which intensity of the interference signal is greater than the reference value. The MCRC information of the corresponding terminal 100 can be known based on the UL-MAP.

If the femto base station 200 does not know the uplink resource allocation information of the macro base station 300, the femto base station 200 is unable to determine which terminal sent the interference signal. In this case, information about the interference signal can include information about a point of a time when a section where intensity of the interference signal is greater than a reference value is started or the length of the section, or both. The femto base station 200 sends an interference report message, including the MCRC information, to the macro base station 300 at step S420.

When the macro base station 300 triggers handover based on the interference report message, the femto base station 200 receives a handover request message from the terminal 100 at step S430 and performs a ranging and network reestablishment procedure with the terminal 100 at step S440. After the handover procedure is completed, the femto base station 200 sends a handover complete message to the macro base station 300 at step S450 and receives data buffered in the macro base station 300 at step S460.

Figure 5:
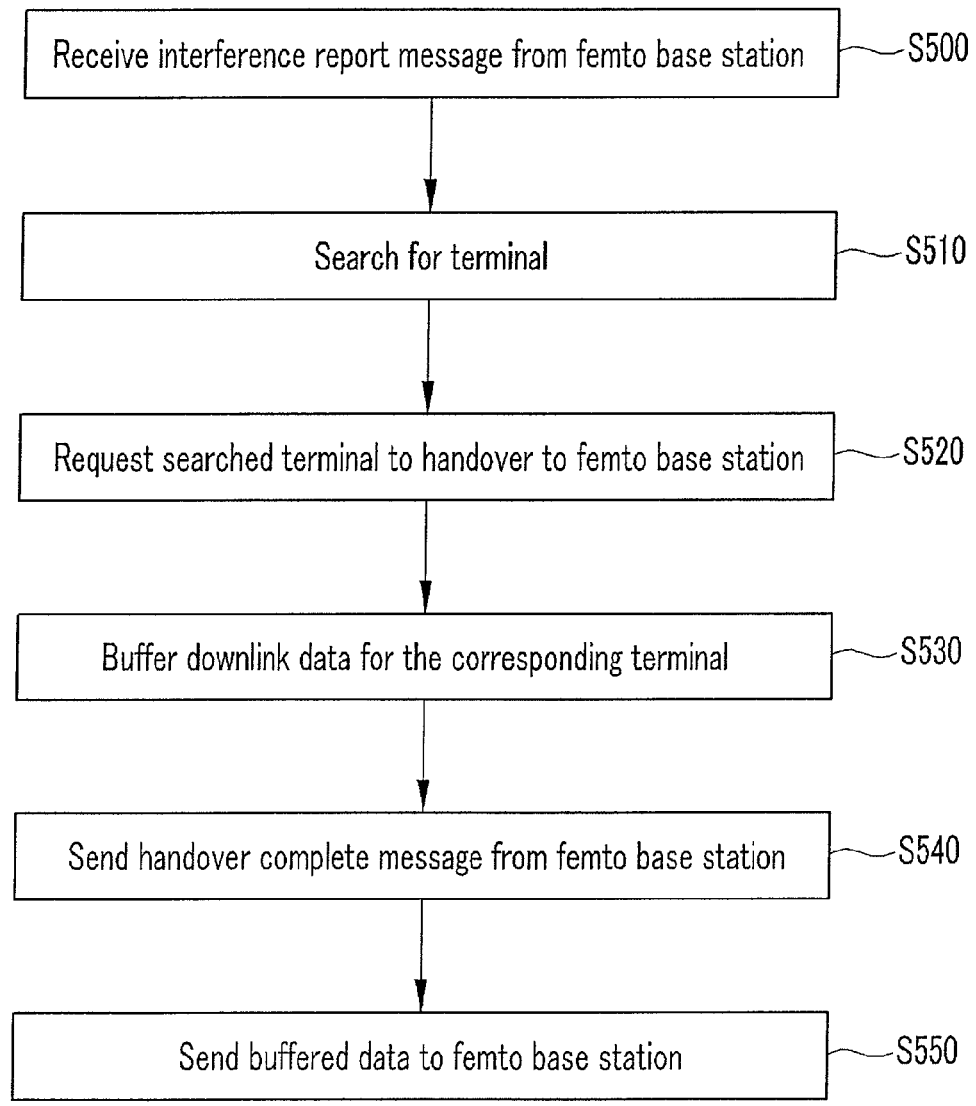
FIG. 5 is a flowchart illustrating an operation of a macro base station in a handover method according to an exemplary embodiment of the present invention.

FIG. 5 is a flowchart illustrating an operation of a macro base station in a handover method according to an exemplary embodiment of the present invention.

Referring to FIG. 5, a macro base station 300 receives an interference report message from a femto base station 200 at step S500, and searches for a terminal 100 that has entered the femto base station 200 coverage area based on information included in the interference report message at step S510. If the femto base station 200 has already determined an UL-MAP of the macro base station 300 (i.e., the interference report message including MCRC information), the macro base station 300 identifies the terminal 100 based on the MCRC information. If the femto base station 200 has not determined the UL-MAP of the macro base station 300 (i.e., the interference report message including information about a point of a time when a section where intensity of an interference signal is greater than a reference value is started or a length of the section or both), the macro base station 300 identifies the terminal 100 to which uplink resources have been allocated during the corresponding section.

The macro base station 300 requests the terminal 100 to hand over to the femto base station 200 at step S520. The macro base station 300 buffers downlink data for the corresponding terminal 100 at step S530. When a handover complete message is received from the femto base station 200 at step S540, the macro base station 300 sends the buffered data to the femto base station 200 at step S550.

Figure 6:
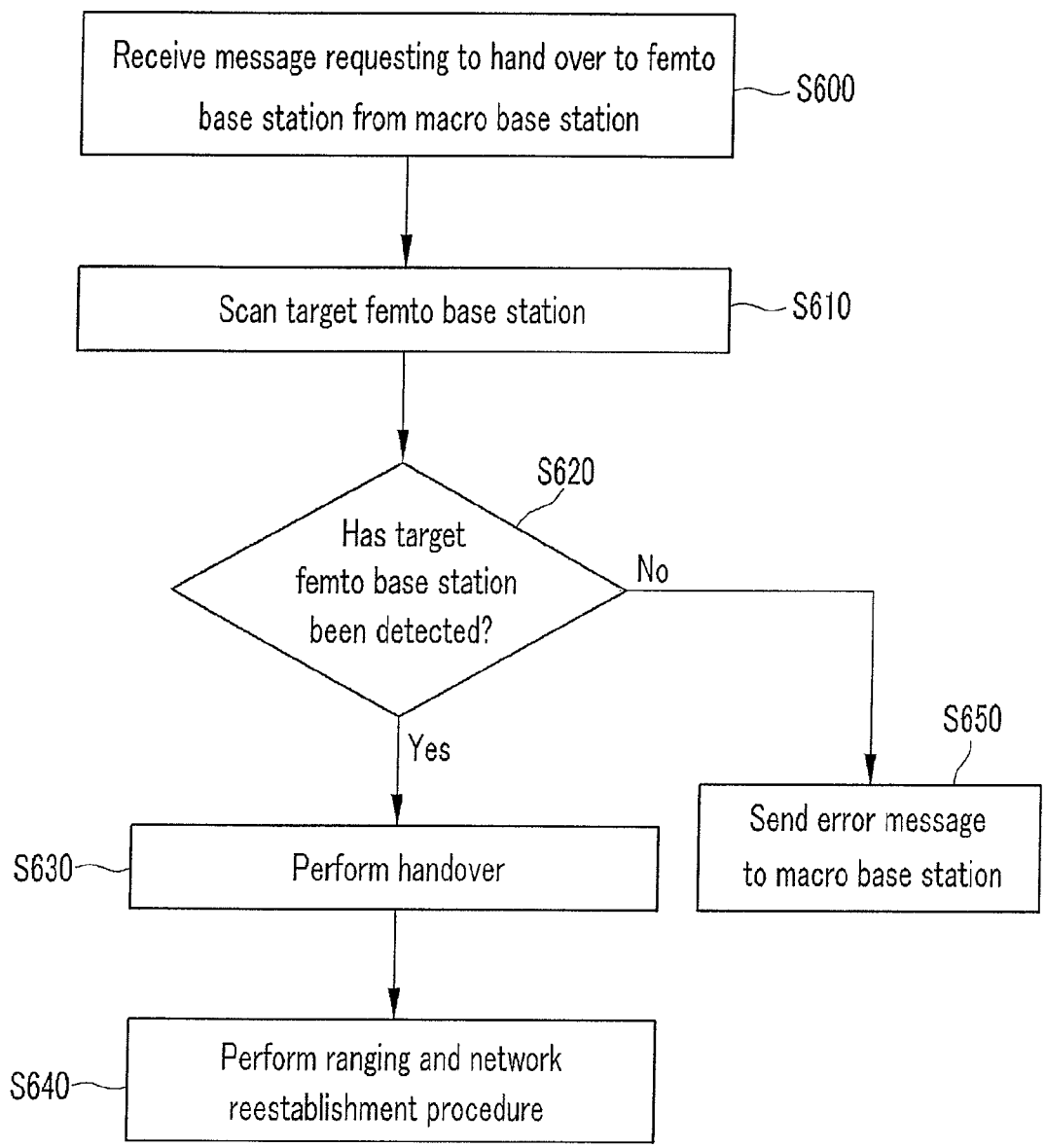
FIG. 6 is a flowchart illustrating an operation of a terminal in a handover method according to an exemplary embodiment of the present invention.

FIG. 6 is a flowchart illustrating an operation of a terminal in a handover method according to an exemplary embodiment of the present invention.

Referring to FIG. 6, when a message requesting to handover to a femto base station 200 is received from the macro base station 300 at step S600, the terminal 100 scans a target femto base station 200 at step S610.

When the terminal 100 detects the target femto base station 200 at step S620, the terminal 100 performs a procedure for the handover with the femto base station 200 at step S630, and then performs a ranging and network reestablishment procedure at step S640. If the terminal 100 has not detected the target femto base station 200 at S620, the terminal 100 sends an error message to the macro base station 300 at step S650. The error message can be transmitted with an error code included in a handover indication message.

The exemplary embodiments of the present invention are not implemented only through the above-described methods and apparatuses, but may be implemented through a program for realizing a function corresponding to a construction according to an exemplary embodiment of the present invention or a recording medium on which the program is recorded.

While the invention has been shown and described with reference to certain exemplary embodiments thereof, it will be understood by those skilled in the art that various changes in form and details may be made therein without departing from the spirit and scope of the invention as defined by the claims and their equivalents.

What is claimed is:

1. A method of performing a handover procedure of a femto base station in a wireless communication system in which a macro base station and the femto base station coexist, the method comprising:
   detecting an uplink signal transmitted from a terminal to the macro base station;
   sending a report message including information about the uplink signal to the macro base station, the information about the uplink signal including information about a section in which an intensity of the uplink signal is greater than a reference value, the information about the section including Masked Cyclic Redundancy Check (MCRC) information about the section, information about a beginning time and a length of the section: and
   when the macro base station triggers handover based on the report message, performing the handover procedure with the terminal that is identified by the macro base station as a terminal to which an uplink resource has been allocated during the section,
   wherein the terminal is unable itself to trigger the handover because a difference between an intensity of a signal received from the macro base station and an intensity of a signal received from the femto base station is not sufficient.

2. The method of claim 1, further comprising:
   determining, by the femto base station, uplink resource allocation information of the macro base station; and
   generating, by the femto base station, the information about the uplink signal based on the uplink resource allocation information.

3. The method of claim 1, wherein the performing of the handover procedure with the terminal comprises receiving a handover request message from the terminal.

4. The method of claim 1, wherein the performing of the handover procedure with the terminal comprises:
   sending a handover complete message to the macro base station; and
   receiving downlink data for the terminal from the macro base station.

5. A method of performing a handover procedure of a macro base station in a wireless communication system in which the macro base station and a femto base station coexist, the method comprising:
   receiving a report message including information about an uplink signal recognized by the femto base station from the femto base station;
   identifying a terminal that has entered a coverage area of the femto base station based on the report message, the report message including information about a section in which an intensity of the uplink signal is greater than a reference value, the information about the section including Masked Cyclic Redundancy Check (MCRC) information about the section, information about a beginning time and a length of the section, and the identified terminal being a terminal to which an uplink resource has been allocated during the section; and
   requesting the identified terminal to hand over to the femto base station~ wherein the identified terminal is itself unable to trigger the handover because a difference between an intensity of a signal received from the macro base station and an intensity of a signal received from the femto base station is not sufficient.

6. The method of claim 5,
   wherein the identifying of the terminal comprises identifying the terminal based on the MCRC information about the section, if the information about the uplink signal includes the MCRC information.

7. The method of claim 5,
   wherein the identifying of the terminal comprises identifying the terminal based on uplink resource allocation information during the length of the section, if the information about the uplink signal includes information about the length of the section.

8. The method of claim 5, further comprising:
   buffering downlink data for the terminal;
   receiving a handover complete message from the femto base station; and
   sending the buffered downlink data to the femto base station.

9. A handover performing apparatus of a femto base station, the handover performing apparatus comprising:
   a receiving unit for receiving an uplink signal from a terminal;
   an uplink information acquisition unit for acquiring information about the uplink signal;
   a transmission unit for sending the information about the uplink signal to a macro base station, the information about the uplink signal including information about a section in which an intensity of the uplink signal is greater than a reference value, the information about the section including Masked Cyclic Redundancy Check (MCRC) information about the section, information about a beginning time and a length of the section; and
   a handover processing unit for performing a handover procedure triggered by the macro base station with the terminal by the macro base station as to which an uplink resource has been allocated during the section, based on the information about the uplink signal when the terminal is itself unable to trigger the handover because a difference between an intensity of a signal received from the macro base station and an intensity of a signal received from the femto base station is not sufficient.

10. The handover performing apparatus of claim 9, wherein if the femto base station knows uplink resource allocation information of the macro base station, the information about the section includes the MCRC information about the section.

11. The handover performing apparatus of claim 9, wherein if the femto base station does not know uplink resource allocation information of the macro base station, the information about the section includes the information about the beginning time or the length of the section.

12. A handover performing apparatus of a macro base station, the handover performing apparatus comprising:
   a receiving unit for receiving information about an uplink signal, recognized by a femto base station, from the femto base station;
   a terminal search unit for identifying a terminal that has entered the femto base station coverage area based on the information about the uplink signal, the information about the uplink signal including information about a section in which an intensity of the uplink signal is greater than a reference value, the information about the section including Masked Cyclic Redundancy Check (MCRC) information about the section information about a beginning time and a length of the section, and the identified terminal being a terminal to which an uplink resource has been allocated during the section; and a handover processing unit for requesting the identified terminal to hand over to the femto base station when the terminal is itself unable to trigger the handover because a difference between an intensity of a signal received from the macro base station and an intensity of a signal received from the femto base station is not sufficient.

13. The handover performing apparatus of claim 12, wherein the terminal search unit identifies the terminal based on MCRC information about the section, if the information about the uplink signal includes the MCRC information.

14. The handover performing apparatus of claim 12, wherein the terminal search unit identifies the terminal based on uplink resource allocation information during the length of the section, if the information about the uplink signal includes information about the length of the section.

* * * * *